United States Patent [19]

Hibner

[11] Patent Number: 4,657,410
[45] Date of Patent: Apr. 14, 1987

[54] NUTATION DAMPER

[75] Inventor: David H. Hibner, Colchester, Conn.

[73] Assignee: United Technologies Corporation, Hartford, Conn.

[21] Appl. No.: 844,036

[22] Filed: Mar. 25, 1986

[51] Int. Cl.[4] .......................... F16C 27/00; F16C 3/00; F16F 15/16

[52] U.S. Cl. ...................................... 384/99; 384/215; 464/180; 74/574

[58] Field of Search ................. 384/99, 100, 215, 452, 384/456, 462, 535, 581; 74/574; 464/180

[56] References Cited

U.S. PATENT DOCUMENTS

| | | |
|---|---|---|
| 2,631,901 | 3/1953 | Holben et al. |
| 3,373,633 | 3/1968 | Desmond et al. ............. 384/215 X |
| 3,420,072 | 1/1969 | Baier et al. ....................... 464/180 X |
| 3,844,630 | 10/1974 | Lechner . |
| 4,336,968 | 6/1982 | Hibner .................. 384/99 |
| 4,337,983 | 7/1982 | Hibner .................. 384/99 |
| 4,509,804 | 4/1985 | Klusman ..................... 384/99 |

FOREIGN PATENT DOCUMENTS

| | | | |
|---|---|---|---|
| 8100898 | 4/1981 | World Int. Prop. O. .......... | 384/215 |
| 1212599 | 11/1970 | United Kingdom .................. | 384/99 |

Primary Examiner—John M. Jillions
Assistant Examiner—Thomas R. Hannon
Attorney, Agent, or Firm—Troxell K. Snyder

[57] ABSTRACT

A damper for absorbing nutating motion of a rotating shaft (10) at a bearing (12) includes a radially-extending, non-rotating flange (30) flanked axially by fluid-filled damping volumes (34, 36) formed between the flange (30) and a stable support frame (18).

7 Claims, 3 Drawing Figures

NUTATION DAMPER

FIELD OF THE INVENTION

The present invention relates to a dynamic motion damper, and more particularly, to a damper for resisting nutating-type motion.

BACKGROUND

The use of bearing dampers in rotating equipment for absorbing radial or axial movement induced by an imbalance or other nonuniformity has long been recognized as an effective method for reducing the vibration or other undesirable effects which can result therefrom. One particular type of damper which is especially effective in absorbing radial deflections is an annular oil damper wherein a viscous damping fluid, such as oil, is confined in an axially extending, annular volume formed between a non-rotating outer bearing structure and a surrounding support frame. Orbital radial movement of the bearing race within the frame forces circumferential flow of the contained oil within the annulus. The high shear and pressure forces induced in the viscous oil resist the radial deflection of the outer race, absorbing and hence reducing the magnitude of the radial displacement.

Although effective in absorbing radial displacement induced by a shaft imbalance or similar condition, the axially extending annular damper of the prior art is far less effective in absorbing periodic angular movement of the shaft, especially when such angular movement is not accompanied by significant radial displacement. Such movement, known as nutation, can occur in a rotating shaft arrangement at one or more critical rotational speeds wherein the spinning shaft is deflected with a mode shape such that the bearing structures are coincident with the nodes of the vibrating shaft hence experiencing little or no transverse (radial) deflection. Such movement is especially prevalent and worrisome in rotating structures having long, flexible shafts secured between a limited number of support bearings, such as an aircraft drive propeller driven by a turboshaft gas turbine engine.

SUMMARY OF THE INVENTION

The present invention provides a damper arrangement for absorbing and resiliently resisting undesirable nutating motion of an outer bearing race of a rotating shaft or the like. The subject damper arrangement is especially effective during operation of the rotating shaft at critical speeds wherein shaft imbalance results in significant shaft sloping but minimal radial deflection at the shaft support bearings.

It is therefore an object of the present invention to provide a damper effective for controlling nutating motion of an outer bearing race or the like.

It is further an object of the present invention to control such nutating motion by means of two radially extending damping cavities formed between a radially extending flange secured to the nutating structure and a stable frame member.

It is still further an object of the present invention to provide a nutation damper operable independent of the occurrence or degree of radial displacement experienced by the nutating structure.

According to the present invention, the outer bearing race is provided with a radially extending flange which is in turn received within a corresponding gap in an outer, stable frame member formed between two transverse frame surfaces. Radially inner and outer sealing means are provided for defining first and second axially spaced-apart radially extending damper volumes which are filled with a damping medium such as viscous oil.

During nutation of the outer bearing race and integral flange, the damping medium is forced to flow circumferentially in the radially extending damper volumes as the flange deflects with respect to the frame surfaces. The resistance to such flow provided by the confined damping medium absorbs energy from the nutating flange, reducing the magnitude of the shaft deflection.

DETAILED DESCRIPTION OF THE PREFERRED EMBODIMENT

Figure 1:
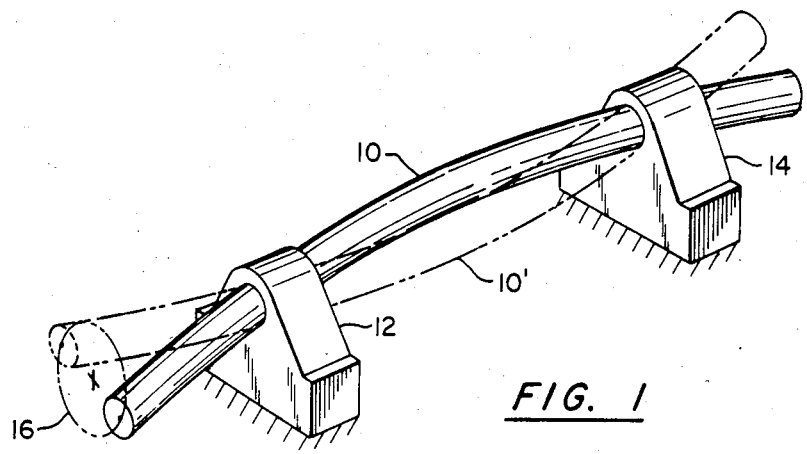
FIG. 1 shows an isometric view of a simply supported shaft experiencing rotational vibration at a critical mode.

FIG. 1 shows a shaft 10 experiencing critical mode vibratory motion (shown greatly exaggerated) and rotationally supported between bearings 12, 14. The shaft 10 is rotating at its critical speed in an imbalance condition, resulting in significant deflection 10, 10' at the central and opposite ends thereof. The magnitude of the transverse displacement of this vibration is dependent on the axial displacement along the shaft 10, being significant at the ends and center portion of the shaft 10, and being minimal at the mode nodal points which are axially coincident with the bearings 12, 14. The shaft 10 thus experiences a three dimensional displacement 16 at the ends and axially central portion thereof, while twisting through the bearings 12, 14 with a rotating sloping movement, hereinafter termed "nutation".

Typical bearing dampers are primarily effective for absorbing radial or axial movement of rotating shafts, being generally effective for most applications. As can be appreciated from FIG. 1, it is possible for long, flexible shafts operating at critical angular speeds to experience significant vibratory motion which does not result in substantial radial or axial displacement at the shaft bearings 12, 14.

Figure 2:
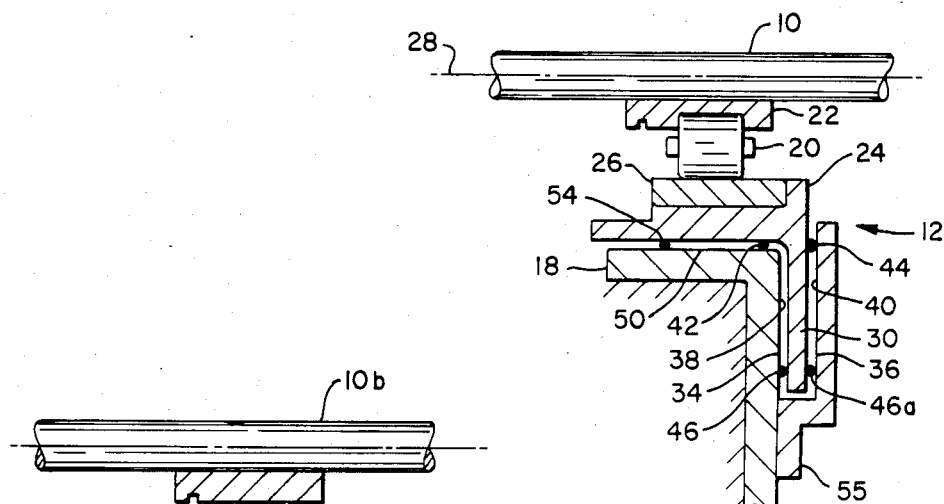
FIG. 2 shows an axial cross section of a damper according to the present invention.

FIG. 2 shows a cross sectional view of a damper arrangement according to the present invention. Only one half-plane of the cross section is shown.

The rotating shaft 10 is shown supported by the bearing arrangement 12 which comprises a plurality of roller bearings 20 circumferentially disposed between an annular inner bearing race 22 and an outer annular bearing race 24. The outer bearing race 24 is resiliently supported relative to the frame member 18. Although indicated as being a fixed support member, frame member 18 may be a mobile support structure such as the outer casing of a gas turbine engine secured to an aircraft or the like.

The resiliently supported outer bearing race 24 includes a radially extending flange portion 30 which is integral with the outer race 24. By the term "integral" it is to be understood that the radially extending flange 30 moves with the outer bearing race 24 as a single member. As used hereinafter, integral thus shall include a physically separate flange structure fixedly secured to the outer bearing race 24 as well as other functionally identical structures wherein flange 30 moves responsive to any movement of the outer bearing race 24.

As will be apparent to those skilled in the art of bearing structures, axial, radial, or nutating movement of the shaft 10 passes through the inner bearing race 22 and roller bearings 20 to the non-rotating outer bearing race 24. Nutating motion in the shaft 10 thus results in like nutation of the flange 30 and a circumferentially periodic axial displacement therein.

The present invention damps such nutation by providing first and second radially extending damping cavities 34, 36 on axially opposite sides of the flange 30. The damping cavities 34, 36 are defined by radial surfaces 38, 40 of the frame member 18 and first and second inner annular sealing means 42, 44, and first and second outer annular sealing means 46, 46a. The sealing means 42, 44, 46, 46a may be resilient O-rings as shown in FIG. 2 as well as any other flexible sealing structure able to accommodate the relative movement of the outer race 24 and frame member 18.

The damper according to the present invention resists nutating motion of the outer bearing 24, and hence the shaft 10, by providing a damping medium, such as viscous oil, filling the radially extending damping volumes 34, 36.

Nutating motion of the outer bearing race 24 and integral flange 30 results in a orbiting, circumferential flow of the damping medium in the radially extending volumes 34, 36. The nutating motion of the flange 30 squeezes the damping medium inducing a leading pressure wave on opposite axial sides of the flange 30 which opposes the nutating motion thereof. The viscosity of the damping medium also acts to oppose the circumferential flow in the cavities 34, 36, extracting energy from the nutating components in the form of fluidic frictional heating.

It should be apparent at this point in the description that the size of the radially extending flange 30 and chambers 34, 36 is dependent upon the degree of shaft nutation expected as well as the degree of damping desired. For damping media such as viscous oils, the density, viscosity, and pressure of the oil in the chambers 34, 36 may also be specified so as to provide the desired damper performance.

FIG. 2 also shows an axially extending annular damping volume 50 disposed between the frame 18 and the outer bearing race 24, further defined by the first inner annular sealing means 42 and a first axial seal member 54. The axially extending volume 50, if filled with a damping medium such as viscous oil, acts as a prior art annular damper for absorbing radial displacement induced by imbalance in the rotating shaft 10. As shown in FIG. 2, the first inner annular sealing means 42 seals both the axially extending damping volume 50 and the first radially extending damper volume 34. It is important to note that the first inner annular sealing means 42 need not be located precisely radially inward of the first outer annular sealing means 46, however there must not be significant axial displacement therebetween in order to ensure effectiveness of the nutation damping volume 34.

As will be appreciated by considering the structure of FIG. 2 wherein the combined sealing member 42 has been removed, it is apparent that the damping medium would experience reversing flow between the now contiguous volumes 50, 34 during nutation of the outer bearing race 24. Such reversing flow would greatly reduce the circumferential flow of damping medium in the radially extending volume 34, thus reducing the damping effectiveness with regard to such nutating motion. In short summary, the radially extending damping cavities 34, 36 must not be in fluid communication with any substantially axially extending volumes responsive to the nutating motion of the outer race 24.

Figure 3:
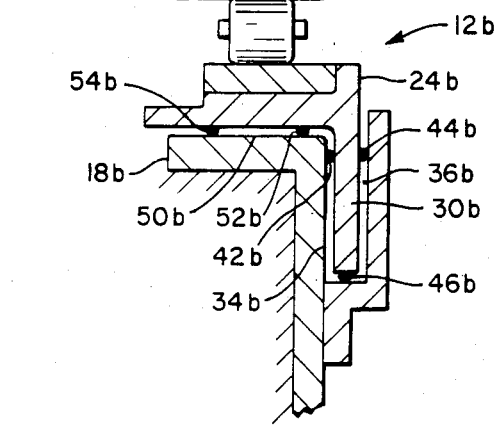
FIG. 3 shows an axial cross section of an alternative embodiment of the damper according to the present invention.

FIG. 3, wherein like elements are identified by like reference numerals having a suffix (b) appended thereto, shows a functionally identical damper arrangement 12b wherein the sealing means 42b, 44b, 46b, 52b, 54b are disposed between the outer race 24b and the frame member 18b as shown. Significant to the FIG. 3 arrangement are the provisions of separate sealing means 52b, 42b for the adjacent ends of the axially extending volume 50b and the first radially extending volume 34b, as well as the use of a single seal 46b for separating the radially extending volumes 34b, 36b at the radially outer peripheries thereof.

Both FIGS. 2 and 3 show the first inner and outer sealing means 42, 46 (42b, 46b) disposed at substantially equivalent radii to that of the corresponding second inner and outer annular sealing means 44, 46a (44b, 46b). For those damper arrangements wherein the damping medium is a pressurized fluid, the use of equivalent corresponding radii (and hence equivalent axial surface area) on each side of the flange 30 results in an axial pressure balance on the flange 30. Such an arrangement is well suited to those bearings 12 wherein no significant, continuous axial force is exerted on the outer bearing race 24 by the shaft 10.

For certain applications, such as thrust bearings, a continuous axial force is present and must be accommodated by the bearing structure. Although not shown in the drawing figures, it will be appreciated by those skilled in the art that such thrust may be accommodated by providing an opposing force to the radially extending flange 30 by either providing different damping fluid pressures as between the chambers 34, 36, or by locating corresponding inner and outer annular seals at appropriate different radii to achieve the desired force balance.

The damping fluid in the cavities 50, 34, 36 may be refreshed by means of a supply conduit (not shown) and a fluid vent (not shown) provided in the support frame 18 or other associated structure. The circulation of fresh damping fluid through the cavities (well known in prior art damping systems) may be necessary for dampers located in high temperature environments or wherein the damping fluid is subject to frictional heating due to the flow induced by the movement of the race 24. For gas turbine engine applications, the damping volumes may be linked to the lubricating oil circulating systems, receiving cool oil from the engine oil pump (not shown) and discharging the heated oil into the oil scavenge area of the engine (not shown).

Other features of interest in the embodiments shown in FIGS. 2 or 3 include the use of hardened annular insert 26 as a part of the outer bearing race 24 for contacting the roller bearings 20, and an annular retaining ring 55, typically integral with the frame member 18 but removable so as to permit assembly and/or replacement of the seals, races, and roller bearings.

The present invention thus provides a damper arrangement well suited for resisting and absorbing the energy of nutating motion of an outer bearing race or like structure induced by a rotating shaft imbalance or other phenomenon. It will be appreciated that other embodiments according to the present invention may be made without departing from the scope thereof and that the foregoing description and appended drawing figures should thus be interpreted in an illustrative sense, the scope of this invention being defined only by the claims presented hereinafter.

I claim:

1. A damper arrangement for a rotating shaft subject to nutating motion, comprising:
    a non-rotating, annular outer bearing race disposed coaxially about the rotating shaft,
    bearing means, disposed between the outer bearing race and the rotating shaft, for supporting the shaft and passing the nutating motion thereof to the outer bearing race;
    a frame member, surrounding the outer bearing race and having first and second spaced apart axially facing frame surfaces defining an annular, radially extending gap therebetween;
    a flange, integral with the outer bearing race and extending radially therefrom, the flange being received within the radially extending gap;
    first and second inner annular seals, each disposed axially proximate the flange on axially opposite sides thereof and being sealingly engaged between the frame member and the integral outer bearing race and flange;
    outer means, disposed radially outward of the first and second inner annular seals, for annularly sealing between the flange and the frame member, the outer sealing means, in cooperation with the first and second inner annular seals, the integral outer bearing race and flange, and the frame member, defining first and second radially extending damper volumes on opposite sides of the flange; and
    a damping medium, disposed within the first and second damper volumes.

2. The damper as recited in claim 1, wherein the outer sealing means further comprises
    a first annular outer seal and a second annular outer seal for defining the first and second damper volumes.

3. The damper as recited in claim 2, wherein
    the first and second outer annular seals each include respective third and fourth resilient O-rings.

4. The damper as recited in claim 1, wherein
    the first and second inner annular seals each include respective first and second resilient O-rings.

5. The damper as recited in claim 1, wherein
    the damping medium is a viscous fluid.

6. A damper arrangement for a bearing race subject to nutating and orbital radial motion, comprising:
    first and second axially-spaced apart annular means for sealing between the bearing race and a surrounding frame member, the bearing race, the frame member, and the first and second sealing means forming an axially extending annular damping volume;
    a flange, extending radially from the bearing race, the flange being received in a corresponding radially extending gap in the frame member;
    first and second inner annular seals for sealing between the frame and the respective axially opposite sides of the flange;
    third outer means for sealing between the flange and the frame member, the third outer sealing means, frame, and flange defining two axially spaced apart, radially extending damper volumes on axially opposite sides of the flange; and
    a damping fluid, filling the axially extending annular damping volume and the two radially extending damping volumes.

7. The damper as recited in claim 6, wherein
    the axially extending annular volume and one of the radially extending damping volumes are adjacently disposed, and wherein
    the first annular sealing means includes the first inner annular seal.

* * * * *